(12) United States Patent
Cao

(10) Patent No.: US 8,706,830 B2
(45) Date of Patent: Apr. 22, 2014

(54) DEVICE AND METHOD FOR ENABLING HIERARCHICAL QUALITY OF SERVICE SERVICES

(75) Inventor: Dengyuan Cao, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 160 days.

(21) Appl. No.: 13/379,012

(22) PCT Filed: May 31, 2010

(86) PCT No.: PCT/CN2010/073405
§ 371 (c)(1), (2), (4) Date: Dec. 17, 2011

(87) PCT Pub. No.: WO2010/145445
PCT Pub. Date: Dec. 23, 2010

(65) Prior Publication Data
US 2012/0102133 A1 Apr. 26, 2012

(30) Foreign Application Priority Data
Jun. 19, 2009 (CN) .......................... 2009 1 0087377

(51) Int. Cl.
*G06F 15/16* (2006.01)
*H04L 12/56* (2006.01)

(52) U.S. Cl.
CPC ............. *H04L 47/782* (2013.01); *H04L 47/805* (2013.01)
USPC ........................................ 709/208; 709/223

(58) Field of Classification Search
CPC ...... H04L 47/782; H04L 47/805; H04L 47/60
USPC ........ 709/208–211, 223–237; 705/7.36, 7.11, 705/7.22; 370/229–240
See application file for complete search history.

(56) References Cited

U.S. PATENT DOCUMENTS

| 5,893,116 | A | * | 4/1999 | Simmonds et al. | ........... 709/229 |
| 6,449,650 | B1 | * | 9/2002 | Westfall et al. | ............... 709/228 |
| 6,490,629 | B1 | * | 12/2002 | Milliken et al. | ............... 709/232 |
| 6,744,767 | B1 | * | 6/2004 | Chiu et al. | ............... 370/395.21 |
| 6,795,441 | B1 | * | 9/2004 | Widmer et al. | ............ 370/395.4 |

(Continued)

OTHER PUBLICATIONS

Jain (Jain, Manish, QoS-Guaranteed Path Selection Algorithm for Service Composition, 2006, IEEE, p. 288-289).*

(Continued)

*Primary Examiner* — Brian J Gillis
*Assistant Examiner* — Michael A Keller
(74) *Attorney, Agent, or Firm* — Ling Wu; Stephen Yang; Ling and Yang Intellectual Property

(57) ABSTRACT

The invention discloses a device for enabling hierarchical quality of service (HQOS) services, the device including: an information receiving module for receiving service types and service processing information; an information distribution module for determining an object service tree according to the received service types and service processing information, and storing the received service types on the node to be processed of the object service tree; and a service management module for traversing the object service tree and performing corresponding operations on the identified nodes in the traversing process. The invention also discloses a method for enabling the HQOS services, the method including: the service management module traversing the object service tree, and performing the corresponding operations on the identified nodes in the traversing process.

18 Claims, 3 Drawing Sheets

(56) References Cited

U.S. PATENT DOCUMENTS

| | | | | |
|---|---|---|---|---|
| 6,975,638 | B1* | 12/2005 | Chen et al. | 370/412 |
| 7,079,552 | B2* | 7/2006 | Cain et al. | 370/469 |
| 7,099,932 | B1* | 8/2006 | Frenkel et al. | 709/223 |
| 7,292,531 | B1* | 11/2007 | Hill | 370/230.1 |
| 2002/0002613 | A1* | 1/2002 | Freeman et al. | 709/225 |
| 2002/0124086 | A1* | 9/2002 | Mar | 709/226 |
| 2002/0126690 | A1* | 9/2002 | Narayana et al. | 370/444 |
| 2003/0187817 | A1* | 10/2003 | Agrawal et al. | 707/1 |
| 2004/0081091 | A1* | 4/2004 | Widmer et al. | 370/230 |
| 2005/0091510 | A1* | 4/2005 | McKeon et al. | 713/185 |
| 2005/0286540 | A1* | 12/2005 | Hurtta et al. | 370/401 |
| 2006/0059165 | A1* | 3/2006 | Bosloy et al. | 707/10 |
| 2008/0005112 | A1* | 1/2008 | Shavit et al. | 707/8 |
| 2008/0137655 | A1* | 6/2008 | Kim et al. | 370/389 |
| 2008/0261593 | A1* | 10/2008 | Wong et al. | 455/435.1 |
| 2009/0037685 | A1* | 2/2009 | Hansen | 711/171 |
| 2010/0146041 | A1* | 6/2010 | Gentry et al. | 709/203 |
| 2011/0051651 | A1* | 3/2011 | Wu et al. | 370/312 |
| 2011/0200028 | A1* | 8/2011 | Suzuki et al. | 370/338 |

OTHER PUBLICATIONS

Chen (Chen, Shigang, Distributed Quality-of-Service Routing in Ad Hoc Networks, Aug. 1999, IEEE Journal on Selected Areas in Communication vol. 17 No. 8, pp. 1488-1505).*

Cisco Systems (Cisco Systems, White Paper DiffServ—The Scalable End-To-End Quality of Service Model, Aug. 2005, Cisco Systems, pp. 1-15).*

Gu (Gu, Xiaohui, Distributed Multimedia Service Composition With Statistical QoS Assurances, Feb. 2006, IEEE Transactions on Multimedia vol. 8. No. 1, pp. 1-11).*

H3C (H3C, H3C SR8800 10G Core Routers HQoS Technology White Paper V1.00, 2007, Hangzhou H3C Technologies Co. Ltd., pp. 1-18).*

Cisco Systems 2 (Cisco Systems, Data Sheet Cisco Modular Quality of Service Command Line Interface, 2005, Cisco Systems, pp. 1-6).*

H3C, HQoS, Technology Introduction QoS, pp. 1-4, May 14, 2009.

* cited by examiner

DEVICE AND METHOD FOR ENABLING HIERARCHICAL QUALITY OF SERVICE SERVICES

TECHNICAL FIELD

The invention relates to the field of communications, in particular, to a device and method for enabling Hierarchical Quality of Service (HQOS) services.

BACKGROUND OF THE RELATED ART

The HQOS technology achieves multi-user multi-service bandwidth guarantees under the Differentiated Service (DiffServ) model through hierarchical scheduling. The structure of a HQOS service tree, as shown in FIG. 1, comprises a port layer, a user group layer, a user layer, a service layer of a total of four layers. The HQOS service tree can embody a tree-liked topology structure and service forwarding paths of a subnet accessing a network through application ports, after being bound with the application ports, and messages of the subnet can be hierarchically scheduled through the HQOS service tree, achieving functions such as congestion avoidance, multi-level scheduling, traffic rate-limiting and traffic statistics, and guaranteeing the bandwidth for each user and each service in an actual network.

At present, three HQOS services i.e., binding, de-binding and updating are used to bind the HQOS service tree and the application ports, revoke the binding between the HQOS service tree and the application ports, or update the HQOS service tree according to the variations of the network structure or associated parameters of the subnet, wherein, the updating HQOS service specifically comprises: a sub-tree adding service, a sub-tree deleting service, a master parameter updating service and a slave parameter updating service, and the device to specifically implement the above HQOS services comprises:

a service management module, which is used to receive service types and service processing information, invoke the service resource management module corresponding to the received service types, and send the received service processing information to the invoked service resource management module, wherein, the service resource management module comprises: a binding module, a de-binding module, a sub-tree adding module, a sub-tree deleting module, a master parameter updating module, and a slave parameter updating module; wherein, the binding module is used to invoke a service tree generating function to generate the HQOS service tree; invoke a table management function to write a software table according to the received service processing information; invoke a tree traversing function to traverse the generated HQOS service tree, and record the next traversed position each time one branch is traversed, and invoke a buffer processing function and a hardware management function to apply and assign resources for each node of the traversed branch, invoke the table management function to write a configuration table according to the received service processing information, then invoke the traversing function again to continue to traverse the generated HQOS service tree from the recorded traversed position;

the de-binding module is used to determine an object service tree according to application ports and application directions in the received service processing information; invoke the table management function to delete table items corresponding to the object service tree; invoke the tree traversing function to traverse the object service tree, and record the next traversed position each time one branch is traversed, invoke the hardware management function and the buffer processing function to release the resources of each node of the traversed branch, invoke the table management function to delete the configuration table corresponding to the traversed branch, then invoke the traversing function again to continue to traverse the object service tree from the recorded traversed position;

the sub-tree adding module is used to determine the object service tree according to the application ports and the application directions in the received service processing information; determine a sub-tree to be added according to relative offsets between the layer where the nodes are located and the nodes in the received service processing information; invoke the tree traversing function to traverse the sub-tree to be added, and record the next traversed position each time one branch is traversed, invoke the buffer processing function and the hardware management function to apply and assign resources for each node of the traversed branch, invoke the table management function to write the configuration table according to the received service processing information, then invoke the traversing function again to continue to traverse the sub-tree to be added from the recorded traversed position;

the sub-tree deleting module is used to determine the object service tree according to the application ports and the application directions in the received service processing information; determine the sub-tree to be deleted according to relative offsets between the layer where the nodes are located and the nodes in the received service processing information; invoke the tree traversing function to traverse the sub-tree to be deleted, and record the next traversed position each time one branch is traversed, invoke the hardware management function and the buffer processing function to release the resources of each node of the traversed tree, invoke the table management function to delete the configuration table corresponding to the traversed branch, then invoke the traversing function again to continue to traverse the sub-tree to be deleted from the recorded traversed position;

the master parameter updating module is used to determine the object service tree according to the application ports and the application directions in the received service processing information; determine the nodes of which the QOS master parameters need to be updated according to relative offsets between the layer where the nodes are located and the nodes in the received service processing information, invoke the table management function to delete table items including the QOS master parameters on the determined nodes in the configuration table, substitute the QOS master parameters in the received service processing information for the corresponding QOS master parameters on the determined nodes, and write the paths passing through the determined nodes into the configuration table, i.e., writing the QOS master parameter of each node on the paths into the configuration table;

the slave parameter updating module is used to determine the object service tree according to the application ports and the application directions in the received service processing information; determine the nodes of which the QOS slave parameters need to be updated according to relative offsets between the layer where the nodes are located and the nodes in the received service processing information, invoke the buffer processing function to acquire the QOS slave parameters of the nodes from the received service processing information, substitute the acquired QOS slave parameters for the corresponding QOS slave parameters buffered in the determined nodes, and invoke the hardware management function to update the hardware resources of the nodes according to the QOS slave parameters after the substitution.

It can be seen that the above device for enabling HQOS services has the following drawbacks:

each HQOS service is implemented by a corresponding independent service resource management module, but a part of the implementation processes of various HQOS services are similar, which makes a part of functions of different service resource management modules be similar, for example, all of the binding module, de-binding module, sub-tree adding module and sub-tree deleting module need to invoke the tree traversing function many times and maintain the traversed position, both the binding module and the sub-tree adding module need to perform the operations for applying and assigning resources for nodes, both the de-binding module and the sub-tree deleting module need to perform the operations for releasing the resources for nodes, and so on, thus making a large number of repeated codes be within the software codes for implementing each service resource management module respectively, increasing the complexity of the codes and the difficulty in maintaining the codes, and therefore, the efficiency of processing the HQOS services is low.

SUMMARY OF THE INVENTION

In view of this, the main purpose of the present invention is to provide a device and method for enabling hierarchical quality of service services, which can reduce the repetitiveness of the software codes for implementing the HQOS services.

In order to achieve the above purpose, the technical solution of the present invention is implemented as follows:

the invention provides a device for enabling hierarchical quality of service services, the device comprising: an information receiving module, an information distribution module, a service management module and a resource management module, wherein, the information receiving module is configured to a receive service type and service processing information of hierarchical quality of service (HQOS) services;

the information distribution module is configured to determine an object service tree according to the received service type and the service processing information, and store the received service type on nodes to be processed of the object service tree;

the service management module is configured to traverse the object service tree and invoke the resource management module when there is a service type stored on the nodes of a currently traversed branch; and is further configured to continue to traverse the object service tree from a next traversed position after the resource management module performing operations associated with the stored service type on the nodes with the service type stored thereon;

the resource management module is configured to perform operations associated with the stored service type on the nodes with the service type stored thereon according to the received service processing information when being invoked by the service management module.

Wherein, the service management module is further configured to invoke a table/table item adding module before traversing the object service tree, when determining the service type received by the information receiving module is a binding service; and is further configured to invoke a table/ table item deleting module after traversing completely the object service tree, when determining the service type received by the information receiving module is a de-binding service;

accordingly, the device further comprises: the table/table item adding module and the table/table item deleting module; wherein, the table/table item adding module is configured to invoke a table management function to write an application port and an application direction in the received service processing information as well as pointers of port layer nodes of the object service tree into a software table;

the table/table item deleting module is configured to invoke the table management function to delete table items including the application port and the application direction in the received service processing information in the software table.

The information distribution module comprises a first object determining sub-module and a second object determining sub-module; wherein, the first object determining sub-module is configured to, when determining the service type received by the information receiving module is not the binding service, inquire the software table to determine a pointer corresponding to the application port and the application direction in the received service processing information and determine a HQOS service tree pointed by the pointer as the object service tree; and is further configured to determine nodes to be processed according to relative offsets between layers where the nodes are located and the nodes in the received service processing information, and store the received service type on the nodes to be processed;

the second object determining sub-module is configured to, when determining the service type received by the information receiving module is the binding service, invoke a service tree generating function to generate the HQOS service tree, of which each node includes the service type, a pointer of the node, and a pointer of a farther node, and determine the generated HQOS service tree is the object service tree; and is further configured to treat all nodes of the object service tree as the nodes to be processed, and store the received service type on the nodes to be processed.

The resource management module comprises: a resource applying sub-module, a resource releasing sub-module, a master parameter updating sub-module and a slave parameter updating sub-module, wherein, the resource applying sub-module is configured to invoke a buffer processing function to apply buffer resources for the nodes with the service type stored thereon, and acquire and buffer the QOS slave parameters of the nodes with the service types stored thereon in the service processing information from the information receiving module; is further configured to invoke a hardware management function to configure hardware resources for the nodes with the service type stored thereon according to the buffered QOS slave parameters; and is further configured to invoke a table management function to add the pointers of the port layer nodes, the QOS master parameter of each node of the traversed branch as new table items to the configuration table, when determining there is no table item corresponding to a path where the traversed branch is located in the configuration table, and delete the service type stored by the nodes with the service type stored thereon;

the resource releasing sub-module is configured to invoke the hardware management function to release the hardware resources of the nodes with the service types stored thereon; is further configured to invoke the buffer processing function to release the QOS slave parameters buffered by the nodes with the service types stored thereon and the buffer resources of the nodes with the service types stored thereon; and is further configured to invoke the table management function to delete the table items corresponding to the path where the traversed branch is located in the configuration table, when determining there are table items corresponding to the path where the traversed branch is located in the configuration table, and delete the service type stored by the nodes with the service type stored thereon;

the master parameter updating sub-module is configured to, when determining the traversed branch is a first tree of the path where the traversed branch is located, invoke the table management function to delete the table items corresponding to the path where the traversed branch is located in the configuration table, substitute the QOS master parameters in the received service processing information for the QOS master parameters of corresponding nodes on the traversed branch, and add the pointers of the port layer nodes, the QOS master parameter of each node of the traversed branch after the substitution as new table items to the configuration table, and delete the user types on all nodes except the user group layer nodes on the traversed branch; is further configured to delete the service types on the user group layer nodes on the traversed branch, when determining the path where the traversed branch is located is the last path including the user layer nodes of the traversed branch and there is a service type stored on the user group layer nodes on the traversed branch;

the slave parameter updating sub-module is configured to invoke the buffer processing function to acquire the QOS slave parameters of the nodes with the service type stored thereon in the service processing information from the information receiving module, and substitute the QOS slave parameters for the corresponding QOS slave parameters buffered by the nodes with the service type stored thereon; and is further configured to invoke the hardware management function to update the hardware resources of the nodes with the service type stored thereon according to the QOS slave parameters after the substitution, and delete the service type stored by the nodes with the service type stored thereon.

The invention also provides a method for enabling hierarchical quality of service services, the method comprising:

receiving a service type and service processing information of HQOS;

determining an object service tree according to the received service type and service processing information, and storing the received service type on nodes to be processed of the object service tree;

traversing the object service tree and performing operations associated with the stored service type on the nodes with the service type stored thereon according to the received service processing information, when there is a service type stored on the nodes of a currently traversed branch; and then continuing to traverse the object service tree from the next traversed position.

Wherein, when the received service type is a binding service, before traversing the object service tree, the method further comprises:

invoking a table management function to write an application port and an application direction in the received service processing information as well as pointers of port layer nodes of the object service tree into a software table.

When the received service type is a de-binding service, after traversing completely the object service tree, the method further comprises:

invoking the table management function to delete the table items including the application port and the application direction in the received service processing information in the software table.

Furthermore, when the received service type is not a binding service, determining the object service tree and storing the received service type on the nodes to be processed of the object service tree is specifically:

inquiring the software table to determine the pointers corresponding to the application port and the application direction in the received service processing information, and determining the HQOS service tree pointed by the pointers as the object service tree; and determining the nodes to be processed according to relative offsets between layers where the nodes are located and the nodes in the received service processing information, and storing the received service type on each node determined to be processed.

Furthermore, when the received service type is a binding service, the operation of determining the nodes to be processed and storing the received service type on the nodes to be processed of the object service tree is specifically:

invoking a service tree generating function to generate the HQOS service tree, of which each node includes the service type, the pointers of the nodes, and pointers of farther nodes, and determining the generated HQOS service tree is the object service tree, treating all the nodes of the object service tree as the nodes to be processed, and storing the received service type on the nodes to be processed.

Furthermore, when the stored service type is a binding service or a sub-tree adding service, performing the operations associated with the stored service type on the nodes comprises: invoking a buffer processing function to apply buffer resources for the nodes with the service type stored thereon, and acquiring and buffering the QOS slave parameters of the nodes with the service type stored thereon from the received service processing information; invoking a hardware management function to configure hardware resources for the nodes with the service type stored thereon according to the buffered QOS slave parameters; invoking a table management function to add the pointers of the port layer nodes, the QOS master parameter of each node of the traversed branch as new table items to the configuration table, when determining there is no table item corresponding to the path where the traversed branch is located in the configuration table; and deleting the service type stored by the nodes with the service type stored thereon;

when the stored service type is a de-binding service or a sub-tree deleting service, performing the operations associated with the stored service type on the nodes comprises: invoking the hardware management function to release the hardware resources of the nodes with the service type stored thereon; invoking the buffer processing function to release the QOS slave parameters buffered by the nodes with the service type stored thereon and the buffer resources of the nodes with the service type stored thereon; invoking the table management function to delete the table items corresponding to the path where the traversed branch is located in the configuration table, when determining there are table items corresponding to the path where the traversed branch is located in the configuration table; and deleting the service type stored by the nodes with the service type stored thereon;

when the stored service type is a master parameter updating service, performing the operations associated with the stored service type on the nodes comprises:

A. determining whether the traversed branch is a first tree of the path where the traversed branch is located, and if the traversed branch is the first branch, invoking the table management function to delete the table items corresponding to the path where the traversed branch is located in the configuration table, substituting the QOS master parameters in the received service processing information for the QOS master parameters of the corresponding nodes on the traversed branch, and adding the pointers of the port layer nodes, the QOS master parameter of each node of the traversed branch after the substitution as new table items to the configuration table, deleting the user types on all nodes except the user group layer nodes on the traversed branch, and performing step B; if the traversed branch is not the first branch, performing step B;

B. determining whether the path where the traversed branch is located is the last path including the user layer nodes of the traversed branch, and if the path is the last path, determining whether there is a service type stored on the user group layer nodes on the traversed branch, and if there is a service type stored on the user group layer nodes, deleting the service type on the user group layer nodes on the traversed branch, and ending the operations on the traversed branch; if there is no service type stored on the user group layer nodes, ending the operations on the traversed branch; and if the path is not the last path, ending the operations on the traversed branch;

when the stored service type is a slave parameter updating service, performing the operations associated with the stored service type on the nodes comprises: invoking the buffer processing function to acquire the QOS slave parameters of the nodes with the service type stored thereon from the received service processing information, and substituting the acquired QOS slave parameters for the corresponding QOS slave parameters buffered by the nodes with the service type stored thereon; invoking the hardware management function to update the hardware resources of the nodes according to the QOS slave parameters after the substitution, and deleting the service type stored by the nodes with the service type stored thereon.

The device and method for enabling hierarchical quality of service services provided by the present invention make the object service tree be traversed by a service management module and perform corresponding operations on the identified nodes in the traversing process to implement various HQOS services by identifying the nodes to be processed and respectively performing operations related to various HQOS services by independent resource management modules, thus simplifying the structure of the device for implementing HQOS services and reducing the repetitiveness of software codes for enabling HQOS services, and enhancing the maintainability and the scalability of the software codes for enabling HQOS services.

PREFERRED EMBODIMENTS OF THE PRESENT INVENTION

Figure 2:
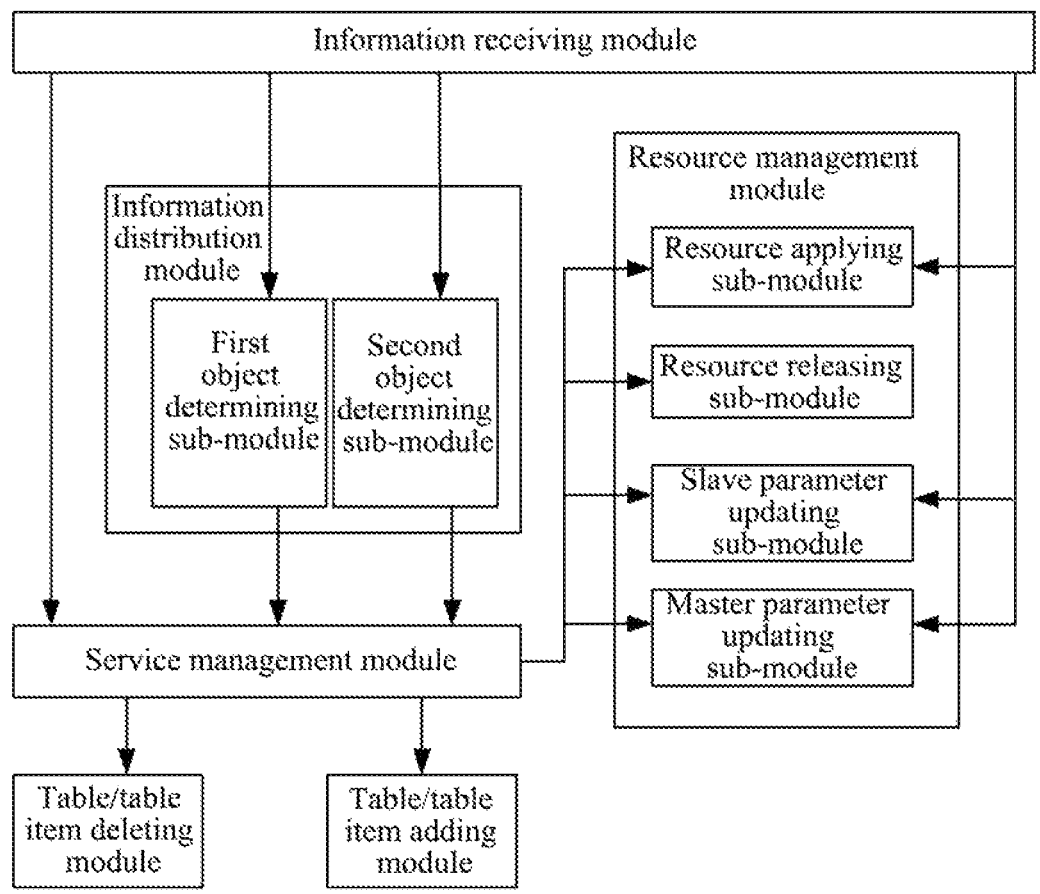
FIG. 2 is a structural diagram of an device for enabling hierarchical quality of service services according to the embodiment of the present invention.

A structural diagram of an device for enabling HQOS services according to the embodiments of the present invention, as shown in FIG. 2, comprises an information receiving module, an information distribution module, a service management module and a resource management module, wherein, the information receiving module is used to receive a service type and service processing information;

wherein, when the received service type is a binding service, the received service processing information includes an application port, an application direction, pointers of the port layer nodes of the HQOS service tree, QOS master parameters and QOS slave parameters; when the received service type is a de-binding service, the received service processing information includes an application port and an application direction; when the received service type is a sub-tree adding service, the received service processing information includes an application port, an application direction, QOS slave parameters and relative offsets between the layer where the nodes are located and the nodes; when the received service type is a sub-tree deleting service, the received service processing information includes an application port, an application direction, QOS slave parameters and relative offsets between the layer where the nodes are located and the nodes; when the received service type is a master parameter updating service, the received service processing information includes an application port, an application direction, QOS mater parameters and relative offsets between the layer where the nodes are located and the nodes; when the received service type is a slave parameter updating service, the received service processing information includes an application port, an application direction, QOS slave parameters and relative offsets between the layer where the nodes are located and the nodes; wherein, the layer where the nodes are located is the layer of each node to be processed in the object service tree;

the information distribution module is used to determine an object service tree according to the received service type and service processing information, and store the received service type on the node to be processed of the object service tree to identify the node to be processed;

the service management module is used to traverse said object service tree, and determine a node is to be processed when there is a service type stored on the node of the currently traversed tree, and invoke the resource management module; and is further used to continue to traverse the object service tree from the next traversed position after the resource management module performs operations associated with the stored service types on the nodes with the service types stored thereon;

wherein, the next traversed position is determined by a tree traversing algorithm used; here, the traversing is performed using a branch as a traversing unit, and the next traversed position is a leaf node of a branch next to the currently traversed branch. Taking the traversing of the HQOS service tree shown in FIG. 1 as an example, the traversing is started from service (1), and the branch where service (1) is located is firstly traversed, i.e., the currently traversed branch is service (1)-user (1)-user group (1)-port, and the next traversed position is service (2).

the resource management module is configured to perform operations associated with the stored service types on the nodes with the service types stored thereon according to the service processing information received by the information receiving module when being invoked by the service management module;

here, the service types stored by the nodes are HQOS service types, which can be a binding service, a sub-tree adding service, a de-binding service, a sub-tree deleting service, a slave parameter updating service or a master parameter updating service.

wherein, the operations related to the binding service or sub-tree adding service are: invoking a buffer processing function to apply a buffer resource for the node, and acquire and buffer the QOS slave parameters of the node from the received service processing information; and invoking a hardware management function to configure hardware resources for the nodes according to the buffered QOS slave parameters;

the operations related to the de-binding service or sub-tree deleting service are: releasing the hardware resources of the nodes, and releasing the QOS slave parameters buffered by the nodes and the buffer resources of the nodes;

the operations related to the slave parameter updating service are: acquiring the QOS slave parameters of the nodes from the received service processing information, substituting the acquired QOS slave parameters for the corresponding QOS slave parameters buffered by the node, and updating the hardware resources of the nodes with the service types stored thereon according to the QOS slave parameters after the substitution;

the operations related to the master parameter updating service are: deleting a table item including the QOS master parameters on the nodes with the service type stored thereon in a configuration table, substituting the QOS master parameters in the received service processing information for the QOS master parameters on the corresponding nodes with service types stored thereon, and writing the path passing through the nodes with service types stored thereon into the configuration table.

Here, the service management module is further used to invoke a table/table item adding module before traversing the object service tree, when determining the service type received by the information receiving module is a binding service; and the service management module is further used to invoke a table/table item deleting module after traversing the object service tree completely, when determining the service type received by the information receiving module is a de-binding service.

Accordingly, the device further comprises: the table/table item adding module and the table/table item deleting module; wherein, the table/table item adding module is used to invoke a table management function to write application ports and application directions in the received service processing information as well as pointers of the port layer nodes of the object service tree into a software table;

the table/table item deleting module is used to invoke the table management function, to delete the table items in the software table which includes the application ports and the application directions in the received service processing information, wherein, the information distribution module comprises a first object determining sub-module and a second object determining sub-module; wherein, the first object determining sub-module is used to inquire the software table to determine the pointers corresponding to the application ports and the application directions in the received service processing information and determine the HQOS service tree pointed by the pointers as the object service tree, when determining the service type received by the information receiving module is not the binding service or the master parameter updating service; and is further used to determine the nodes to be processed according to relative offsets between the layer where the nodes are located and the nodes in the received service processing information, and store the received service types on each node determined to be processed;

the second object determining sub-module is used to, when determining the service type received by the information receiving module is a binding service, invoke the service tree generating function to generate the HQOS service tree, and determine the generated HQOS service tree is the object service tree if each node of the generated HQOS service tree includes the service type, a pointer of the node, and a pointer of a farther node; and is further used to treat all the nodes of the object service tree as the nodes to be processed, and store the received service type on each node determined to be processed.

Figure 1:
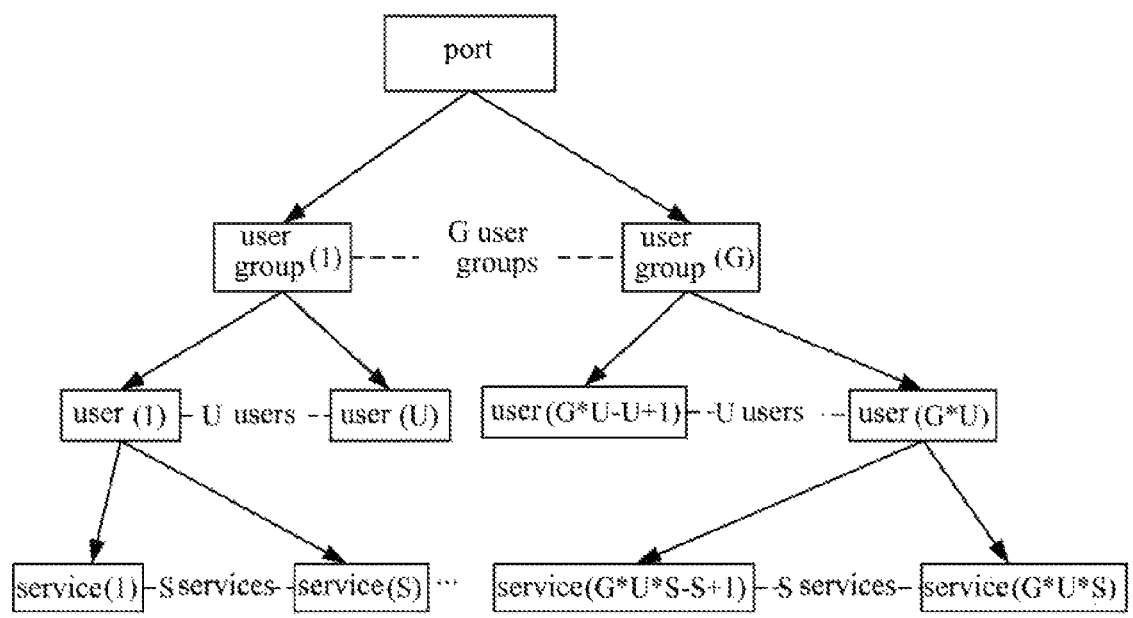
FIG. 1 is a structural diagram of a HQOS service tree.

Wherein, the resource management module comprises: a resource applying sub-module, a resource releasing sub-module, a master parameter updating sub-module and a slave parameter updating sub-module, wherein, the resource applying sub-module is used to invoke a buffer processing function to apply buffer resources for the nodes with the service types stored thereon, and acquire and buffer the QOS slave parameters of the nodes with the service types stored thereon in the service processing information from the information receiving module; invoke a hardware management function to configure hardware resources for the nodes with the service types stored thereon according to the buffered QOS slave parameters; invoke the table management function to add the pointers of the port layer nodes, the QOS master parameter of each node of the traversed branch as new table items to the configuration table, when determining there is no table item corresponding to the path where the traversed branch is located in the configuration table; and delete the service types stored by the nodes with the service types stored thereon; here, the buffer processing function and hardware management function are used to implement the operations for applying and assigning resources for the nodes related to the binding service or sub-tree adding service; here, one path includes a user layer node, a father node of the user layer node and a port layer node, and one path corresponds to a table item in the configuration table;

the resource releasing sub-module is used to invoke the hardware management function to release the hardware resources of the nodes with the service types stored thereon; invoke the buffer processing function to release the QOS slave parameters and buffer resources buffered in the nodes with the service types stored thereon; invoke the table management function to delete the table items corresponding to the path where the traversed tree is located in the configuration table, when determining there is a table item corresponding to the path where the traversed tree is located in the configuration table; and delete the service types stored by the nodes with the service types stored thereon; here, the buffer processing function and hardware management function are used to implement the operations for releasing the resources of the nodes related to the de-binding service or the sub-tree deleting service.

the master parameter updating sub-module is used to invoke the table management function, delete the table items to which the path where the traversed tree is located corresponds in the configuration table, substitute the QOS master parameters of the corresponding nodes on the traversed tree by the QOS master parameters in the received service processing information, and add the pointers of the port layer nodes, the QOS master parameter of each node after the traversed tree is substituted as new table items to the configuration table, and delete the user types on other nodes on the traversed tree except for the user group layer nodes when determining the traversed tree is a first tree of the path where the traversed tree is located; and delete the service types on the user group layer nodes on the traversed tree, when determining the path where the traversed tree is located is the last path including the user layer nodes of the traversed tree and there are service types stored on the user group layer nodes on the traversed tree;

here, the master parameter updating module specifically performs the following operations after being invoked by the service management module:

step A: determining whether the traversed branch is a first branch of the path where the traversed branch is located, if the traversed tree is the first branch, invoking the table management function to delete the table items corresponding to the path where the traversed tree is located in the configuration table, substituting the QOS master parameters in the received service processing information for the QOS master parameters of the corresponding nodes on the traversed branch, adding the pointers of the port layer nodes, the QOS master parameter of each node after the traversed tree is substituted as new table items to the configuration table, and deleting the user types on all nodes on the traversed tree except the user group layer nodes, and performing step B; and if the traversed branch is not the first branch, performing step B;

step B: determining whether the path where the traversed tree is located is the last path including the user layer nodes of the traversed branch, if the path is the last path, determining whether there is a service type stored on the user group layer nodes on the traversed branch, and if there is a service type stored on the nodes, deleting the service types on the user group layer nodes on the traversed branch, and ending the operations on the traversed branch; and if there is no service types stored on the nodes, ending the operations on the traversed branch; and if the path is not the last path, ending the operations on the traversed branch;

wherein, whether the traversed branch is the first branch of the path where the traversed branch is located is determined by the sequence number of the leaf node of the traversed branch. If the sequence number of the leaf node is (the sequence number of the father node of the leaf node −1)*the number of the brother nodes of the leaf node +1, the traversed branch is the first branch of the path where the traversed branch is located; otherwise, the traversed branch is not the first branch of the path where the traversed branch is located;

whether the path where traversed branch is located is the last path including the user layer nodes of the traversed branch is determined by the sequence number of the user layer nodes of the traversed branch. If the sequence number of the user layer nodes is the sequence number of the father node of the user layer node * the number of the brother nodes of user layer nodes, the path where traversed branch is located is the last path including the user layer nodes of the traversed branch; For example, in the HQOS service tree as shown in FIG. 1, the branch with the sequence numbers of the leaf nodes being 1, S+1, . . . , (G*U−1)*S+1 is the first tree of the path where the branch is located, and all the paths where the branch having the user layer nodes being U, 2U, . . . , (G*U) is located is the last path including the user layer node of the branch;

the slave parameter updating sub-module is used to invoke the buffer processing function to acquire the QOS slave parameters of the nodes with the service types stored thereon included in the service processing information from the information receiving module, and substitute the acquired QOS slave parameters for the corresponding QOS slave parameters buffered by the nodes with the service types stored thereon; invoke the hardware management function to update the hardware resources of the nodes with the service types stored thereon according to the QOS slave parameters after the substitution; and delete the service types stored by the nodes with the service types stored thereon; here, the buffer processing function and the hardware management function are used to implement the operations for updating QOS slave parameters and hardware resources for the nodes related to the slave parameter updating service;

wherein, the resource applying sub-module is a resource management module related to the binding service or the sub-tree adding service, the resource releasing sub-module is a resource management module related to the de-binding service or the sub-tree deleting service, the slave parameter updating sub-module is a service management module related to the slave parameter updating service, and the master parameter updating sub-module is a service management module related to the master parameter updating service.

Figure 3:
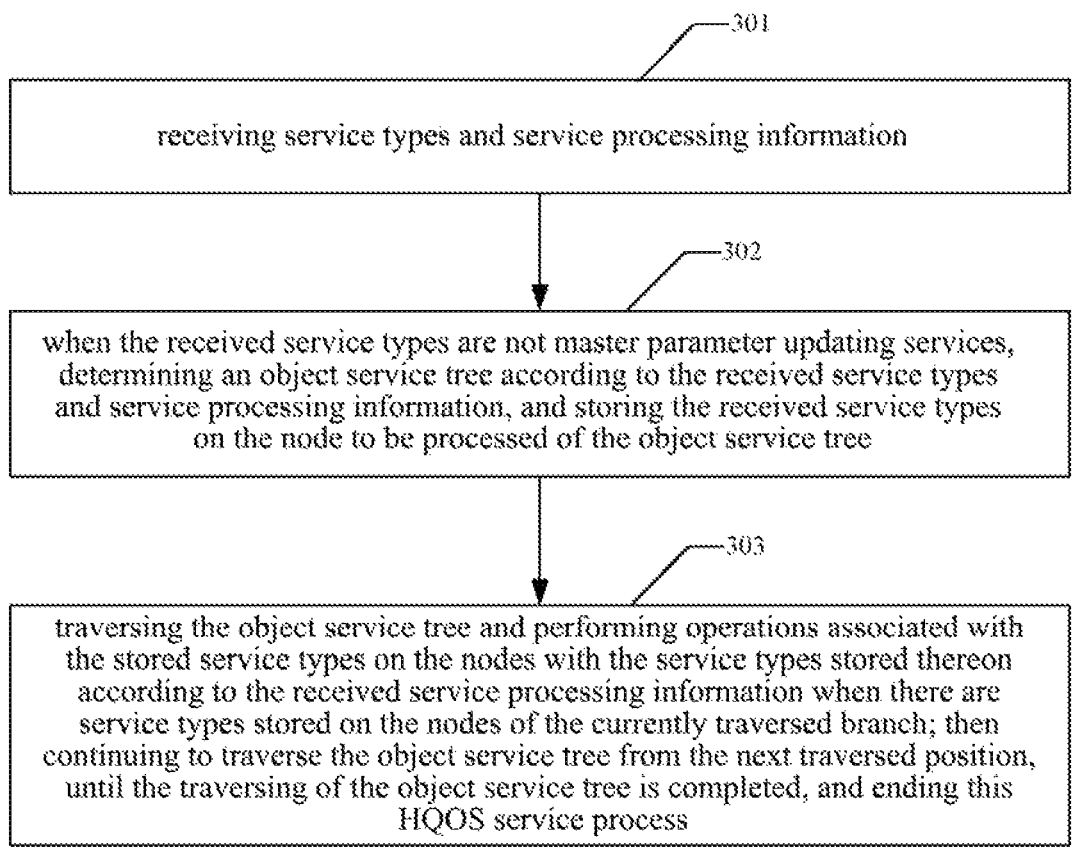
FIG. 3 is a flowchart of a method for enabling hierarchical quality of service services according to the embodiment of the present invention.

A flowchart of a method for enabling hierarchical quality of service services according to the embodiments of the present invention, as shown in FIG. 3, comprises the following steps:

step 301: receiving service types and service processing information;

step 302: determining an object service tree according to the received service types and service processing information, and storing the received service types on the node to be processed of the object service tree.

Here, when the received service types are not binding services, determining the object service tree and storing the received service types on the nodes to be processed of the object service tree comprises:

inquiring a software table, determining the pointers corresponding to the application ports and the application directions in the received service processing information and determining the HQOS service tree pointed by the pointers as the object service tree; determining the nodes to be processed according to the relative offsets between the layer where the nodes are located and the nodes in the received service processing information, and storing the received service types on each node determined to be processed.

When the received service types are binding services, determining the object service tree and storing the received service types on the nodes to be processed of the object service tree comprises:

invoking the service tree generating function to generate the HQOS service tree, and if each node of the generated HQOS service tree includes the service types, a pointer of the node, and a pointer of a farther node, determining the generated HQOS service tree is the object service tree and all the nodes of the object service tree as the nodes to be processed, and storing the received service types on each node determined to be processed.

Step 303: traversing said object service tree and performing operations associated with the stored service types on the nodes with the service types stored thereon according to the received service processing information when there are service types stored on the nodes of the currently traversed branch; then continuing to traverse the object service tree from the next traversed position, until the traversing of the object service tree is completed, and ending this HQOS service process.

Wherein, when the stored service types are binding services or sub-tree adding services, performing the operations associated with the stored service types on the traversed nodes comprises:

invoking a buffer processing function to apply buffer resources for the nodes with the service types stored thereon, and acquiring and buffering the QOS slave parameters of the nodes with the service types stored thereon from the received service processing information; invoking a hardware management function to configure hardware resources for the nodes with service types stored thereon according to the buffered QOS slave parameters; invoking a table management function to add the pointers of port layer nodes, the QOS master parameter of each node of the traversed tree as new table items to the configuration table, when determining there is no table item corresponding to the path where the traversed branch is located in the configuration table, and deleting the service types stored by the nodes with the service types stored thereon;

when the stored service types are de-binding services or sub-tree deleting services, performing the operations associated with the stored service types on the traversed nodes comprises:

invoking the hardware management function to release the hardware resources of the nodes with the service types stored thereon; invoking the buffer processing function to release the QOS slave parameters buffered by and the buffer resources of the nodes with the service types stored thereon; invoking the table management function to delete the table items corresponding to the path where the traversed tree is located in the configuration table, when determining there are table items corresponding to the path where the traversed tree is located in the configuration table; and deleting the service types stored by the nodes with the service types stored thereon;

when the stored service types are master parameter updating services, performing the operations associated with the stored service types on the traversed nodes comprises:

step A. determining whether the traversed branch is the first tree of the path where the traversed branch is located, if the traversed branch is the first tree, invoking the table management function to delete the table items corresponding to the path where the traversed branch is located in the configuration table, substituting the QOS master parameters in the received service processing information for the QOS master parameters of the corresponding nodes on the traversed tree, adding the pointers of the port layer nodes, the QOS master parameter of each node after the traversed tree is substituted as new table items to the configuration table, and deleting the user types on all of nodes except the user group layer nodes on the traversed tree, and performing step B, and if the traversed branch is not the first branch, performing step B;

step B. determining whether the path where the traversed branch is located is the last path including the user layer nodes of the traversed branch, if the path is the last path, determining whether there are service types stored on the user group layer nodes on the traversed branch, and if there are service types stored on the nodes, deleting the service types on the user group layer nodes on the traversed branch, and ending the operations on the traversed branch; and if there are no service types stored on the nodes, ending the operations on the traversed branch; and if the path is not the last path, ending the operations on the traversed branch.

When the stored service types are slave parameter updating services, performing the operations associated with the stored service types on the traversed nodes comprises:

invoking the buffer processing function to acquire the QOS slave parameters of the nodes with the service types stored thereon from the received service processing information, and substitute the acquired QOS slave parameters for the corresponding QOS slave parameters buffered by the nodes with the service types stored thereon; invoking the hardware management function to update the hardware resources of the nodes according to the QOS slave parameters after the substitution, and deleting the service types stored by the nodes with the service types stored thereon.

Here, when the received service types are binding services, before traversing the object service tree, step 303a further comprises:

invoking the table management function to write application ports and application directions in the received service processing information as well as pointers of the port layer nodes of the object service tree into a software table;

when the received service types are de-binding services, after traversing completely the object service tree, step 303a further comprises:

invoking the table management function to delete the table items including the application ports and the application directions in the received service processing information in the software table.

The above description is only the preferred embodiments of the present invention and is not intended to limit the protection scope of the present invention.

What is claimed is:

1. A device for enabling hierarchical quality of service services, the device comprising at least one processor and a memory, the memory comprises:

an information receiving module, an information distribution module, a service management module and a resource management module, wherein, the information receiving module is configured to receive a service type and service processing information of hierarchical quality of service (HQOS) services, wherein the service processing information of HQOS services depends on the service type, specifically:

when the received service type is a binding service, the received service processing information includes an application port, an application direction, pointers of the port layer nodes of the HQOS service tree, QOS master parameters and QOS slave parameters;

when the received service type is a de-binding service, the received service processing information includes an application port and an application direction;

when the received service type is a sub-tree adding service, the received service processing information includes an application port, an application direction, QOS slave parameters and relative offsets between the layer where the nodes are located and the nodes;

when the received service type is a sub-tree deleting service, the received service processing information includes an application port, an application direction, QOS slave parameters and relative offsets between the layer where the nodes are located and the nodes;

when the received service type is a master parameter updating service, the received service processing information includes an application port, an application direction, QOS mater parameters and relative offsets between the layer where the nodes are located and the nodes;

when the received service type is a slave parameter updating service, the received service processing information includes an application port, an application direction, QOS slave parameters and relative offsets between the layer where the nodes are located and the nodes;

the information distribution module is configured to determine an object service tree according to the received service type and the service processing information, and store the received service type on nodes to be processed of the object service tree;

the service management module is configured to traverse the object service tree and invoke the resource management module when there is a service type stored on the nodes of a currently traversed branch; and is further configured to continue to traverse the object service tree from a next traversed position after the resource management module performing operations associated with the stored service type on the nodes with the service type stored thereon;

the resource management module is configured to perform operations associated with the stored service type on the nodes with the service type stored thereon according to the received service processing information when being invoked by the service management module.

2. The device for enabling hierarchical quality of service services according to claim 1, wherein, the service management module is further configured to invoke a table/table item adding module before traversing the object service tree, when determining the service type received by the information receiving module is a binding service; and is further configured to invoke a table/table item deleting module after traversing completely the object service tree, when determining the service type received by the information receiving module is a de-binding service;

accordingly, the device further comprises: the table/table item adding module and the table/table item deleting module; wherein, the table/table item adding module is configured to invoke a table management function to write an application port and an application direction in the received service processing information as well as pointers of port layer nodes of the object service tree into a software table;

the table/table item deleting module is configured to invoke the table management function to delete table items including the application port and the application direction in the received service processing information in the software table.

3. The device for enabling hierarchical quality of service services according to claim 2, wherein, the information distribution module comprises a first object determining sub-module and a second object determining sub-module; wherein, the first object determining sub-module is configured to, when determining the service type received by the information receiving module is not the binding service, inquire the software table to determine a pointer corresponding to the application port and the application direction in the received service processing information and determine a HQOS service tree pointed by the pointer as the object service tree; and is further configured to determine nodes to be processed according to relative offsets between layers where the nodes are located and the nodes in the received service processing information, and store the received service type on the nodes to be processed;

the second object determining sub-module is configured to, when determining the service type received by the information receiving module is the binding service, invoke a service tree generating function to generate the HQOS service tree, of which each node includes the service type, a pointer of the node, and a pointer of a farther node, and determine the generated HQOS service tree is the object service tree; and is further configured to treat all nodes of the object service tree as the nodes to be processed, and store the received service type on the nodes to be processed.

4. The device for enabling hierarchical quality of service services according to claim 2, wherein, the resource management module comprises: a resource applying sub-module, a resource releasing sub-module, a master parameter updating sub-module and a slave parameter updating sub-module, wherein, the resource applying sub-module is configured to invoke a buffer processing function to apply buffer resources for the nodes with the service type stored thereon, and acquire and buffer the QOS slave parameters of the nodes with the service types stored thereon in the service processing information from the information receiving module; is further configured to invoke a hardware management function to configure hardware resources for the nodes with the service type stored thereon according to the buffered QOS slave parameters; and is further configured to invoke a table management function to add the pointers of the port layer nodes, the QOS master parameter of each node of the traversed branch as new table items to the configuration table, when determining there is no table item corresponding to a path where the traversed branch is located in the configuration table, and delete the service type stored by the nodes with the service type stored thereon;

the resource releasing sub-module is configured to invoke the hardware management function to release the hardware resources of the nodes with the service types stored thereon; is further configured to invoke the buffer processing function to release the QOS slave parameters buffered by the nodes with the service types stored thereon and the buffer resources of the nodes with the service types stored thereon; and is further configured to invoke the table management function to delete the table items corresponding to the path where the traversed branch is located in the configuration table, when determining there are table items corresponding to the path where the traversed branch is located in the configuration table, and delete the service type stored by the nodes with the service type stored thereon;

the master parameter updating sub-module is configured to, when determining the traversed branch is a first tree of the path where the traversed branch is located, invoke the table management function to delete the table items corresponding to the path where the traversed branch is located in the configuration table, substitute the QOS master parameters in the received service processing information for the QOS master parameters of corresponding nodes on the traversed branch, and add the pointers of the port layer nodes, the QOS master parameter of each node of the traversed branch after the substitution as new table items to the configuration table, and delete the user types on all nodes except the user group layer nodes on the traversed branch; is further configured to delete the service types on the user group layer nodes on the traversed branch, when determining the path where the traversed branch is located is the last path including the user layer nodes of the traversed branch and there is a service type stored on the user group layer nodes on the traversed branch;

the slave parameter updating sub-module is configured to invoke the buffer processing function to acquire the QOS slave parameters of the nodes with the service type stored thereon in the service processing information from the information receiving module, and substitute the QOS slave parameters for the corresponding QOS slave parameters buffered by the nodes with the service type stored thereon; and is further configured to invoke the hardware management function to update the hardware resources of the nodes with the service type stored thereon according to the QOS slave parameters after the substitution, and delete the service type stored by the nodes with the service type stored thereon.

5. The device for enabling hierarchical quality of service services according to claim 1, wherein, the information distribution module comprises a first object determining sub-module and a second object determining sub-module; wherein, the first object determining sub-module is configured to, when determining the service type received by the information receiving module is not the binding service, inquire the software table to determine a pointer corresponding to the application port and the application direction in the received service processing information and determine a HQOS service tree pointed by the pointer as the object service tree; and is further configured to determine nodes to be processed according to relative offsets between layers where the nodes are located and the nodes in the received service processing information, and store the received service type on the nodes to be processed;

the second object determining sub-module is configured to, when determining the service type received by the information receiving module is the binding service, invoke a service tree generating function to generate the HQOS service tree, of which each node includes the service type, a pointer of the node, and a pointer of a farther node, and determine the generated HQOS service tree is the object service tree; and is further configured to treat all nodes of the object service tree as the nodes to be processed, and store the received service type on the nodes to be processed.

6. The device for enabling hierarchical quality of service services according to claim 1, wherein, the resource management module comprises: a resource applying sub-module, a resource releasing sub-module, a master parameter updating sub-module and a slave parameter updating sub-module, wherein, the resource applying sub-module is configured to invoke a buffer processing function to apply buffer resources for the nodes with the service type stored thereon, and acquire and buffer the QOS slave parameters of the nodes with the service types stored thereon in the service processing information from the information receiving module; is further configured to invoke a hardware management function to configure hardware resources for the nodes with the service type stored thereon according to the buffered QOS slave parameters; and is further configured to invoke a table management function to add the pointers of the port layer nodes, the QOS master parameter of each node of the traversed branch as new table items to the configuration table, when determining there is no table item corresponding to a path where the traversed branch is located in the configuration table, and delete the service type stored by the nodes with the service type stored thereon;

the resource releasing sub-module is configured to invoke the hardware management function to release the hardware resources of the nodes with the service types stored thereon; is further configured to invoke the buffer processing function to release the QOS slave parameters buffered by the nodes with the service types stored thereon and the buffer resources of the nodes with the service types stored thereon; and is further configured to invoke the table management function to delete the table items corresponding to the path where the traversed branch is located in the configuration table, when determining there are table items corresponding to the path where the traversed branch is located in the configuration table, and delete the service type stored by the nodes with the service type stored thereon;

the master parameter updating sub-module is configured to, when determining the traversed branch is a first tree of the path where the traversed branch is located, invoke the table management function to delete the table items corresponding to the path where the traversed branch is located in the configuration table, substitute the QOS master parameters in the received service processing information for the QOS master parameters of corresponding nodes on the traversed branch, and add the pointers of the port layer nodes, the QOS master parameter of each node of the traversed branch after the substitution as new table items to the configuration table, and delete the user types on all nodes except the user group layer nodes on the traversed branch; is further configured to delete the service types on the user group layer nodes on the traversed branch, when determining the path where the traversed branch is located is the last path including the user layer nodes of the traversed branch and there is a service type stored on the user group layer nodes on the traversed branch;

the slave parameter updating sub-module is configured to invoke the buffer processing function to acquire the QOS slave parameters of the nodes with the service type stored thereon in the service processing information from the information receiving module, and substitute the QOS slave parameters for the corresponding QOS slave parameters buffered by the nodes with the service type stored thereon; and is further configured to invoke the hardware management function to update the hardware resources of the nodes with the service type stored thereon according to the QOS slave parameters after the substitution, and delete the service type stored by the nodes with the service type stored thereon.

7. A method for enabling hierarchical quality of service services, wherein, the method comprises:

receiving a service type and service processing information of Hierarchical Quality of Service (HQOS), wherein the service processing information of HQOS services depends on the service type, specifically:

when the received service type is a binding service, the received service processing information includes an application port, an application direction, pointers of the port layer nodes of the HQOS service tree, QOS master parameters and QOS slave parameters;

when the received service type is a de-binding service, the received service processing information includes an application port and an application direction;

when the received service type is a sub-tree adding service, the received service processing information includes an application port, an application direction, QOS slave parameters and relative offsets between the layer where the nodes are located and the nodes;

when the received service type is a sub-tree deleting service, the received service processing information includes an application port, an application direction, QOS slave parameters and relative offsets between the layer where the nodes are located and the nodes;

when the received service type is a master parameter updating service, the received service processing information includes an application port, an application direction, QOS mater parameters and relative offsets between the layer where the nodes are located and the nodes;

when the received service type is a slave parameter updating service, the received service processing information includes an application port, an application direction, QOS slave parameters and relative offsets between the layer where the nodes are located and the nodes;

determining an object service tree according to the received service type and service processing information, and storing the received service type on nodes to be processed of the object service tree;

traversing the object service tree and performing operations associated with the stored service type on the nodes with the service type stored thereon according to the received service processing information, when there is a service type stored on the nodes of a currently traversed branch; and then continuing to traverse the object service tree from the next traversed position.

8. The method for enabling hierarchical quality of service services according to claim 7, wherein, when the received service type is a binding service, before traversing the object service tree, the method further comprises:

invoking a table management function to write an application port and an application direction in the received service processing information as well as pointers of port layer nodes of the object service tree into a software table.

9. The method for enabling hierarchical quality of service services according to claim 8, wherein, when the received service type is not a binding service, determining the object service tree and storing the received service type on the nodes to be processed of the object service tree is specifically:

inquiring the software table to determine the pointers corresponding to the application port and the application direction in the received service processing information, and determining the HQOS service tree pointed by the pointers as the object service tree; and determining the nodes to be processed according to relative offsets between layers where the nodes are located and the nodes in the received service processing information, and storing the received service type on each node determined to be processed.

10. The method for enabling hierarchical quality of service services according to claim 8, wherein, when the received service type is a binding service, the operation of determining the nodes to be processed and storing the received service type on the nodes to be processed of the object service tree comprises:

invoking a service tree generating function to generate the HQOS service tree, of which each node includes the service type, the pointers of the nodes, and pointers of farther nodes, and determining the generated HQOS service tree is the object service tree, treating all the nodes of the object service tree as the nodes to be processed, and storing the received service type on the nodes to be processed.

11. The method for enabling hierarchical quality of service services according to claim 8, wherein, when the stored service type is a binding service or a sub-tree adding service, performing the operations associated with the stored service type on the nodes comprises: invoking a buffer processing function to apply buffer resources for the nodes with the service type stored thereon, and acquiring and buffering the QOS slave parameters of the nodes with the service type stored thereon from the received service processing information; invoking a hardware management function to configure hardware resources for the nodes with the service type stored thereon according to the buffered QOS slave parameters; invoking a table management function to add the pointers of the port layer nodes, the QOS master parameter of each node of the traversed branch as new table items to the configuration table, when determining there is no table item corresponding to the path where the traversed branch is located in the configuration table; and deleting the service type stored by the nodes with the service type stored thereon;

when the stored service type is a de-binding service or a sub-tree deleting service, performing the operations associated with the stored service type on the nodes comprises: invoking the hardware management function to release the hardware resources of the nodes with the service type stored thereon; invoking the buffer processing function to release the QOS slave parameters buffered by the nodes with the service type stored thereon and the buffer resources of the nodes with the service type stored thereon; invoking the table management function to delete the table items corresponding to the path where the traversed branch is located in the configuration table, when determining there are table items corresponding to the path where the traversed branch is located in the configuration table; and deleting the service type stored by the nodes with the service type stored thereon;

when the stored service type is a master parameter updating service, performing the operations associated with the stored service type on the nodes comprises:

A. determining whether the traversed branch is a first tree of the path where the traversed branch is located, and if the traversed branch is the first branch, invoking the table management function to delete the table items corresponding to the path where the traversed branch is located in the configuration table, substituting the QOS master parameters in the received service processing information for the QOS master parameters of the corresponding nodes on the traversed branch, and adding the pointers of the port layer nodes, the QOS master parameter of each node of the traversed branch after the substitution as new table items to the configuration table, deleting the user types on all nodes except the user group layer nodes on the traversed branch, and performing step B; if the traversed branch is not the first branch, performing step B;

B. determining whether the path where the traversed branch is located is the last path including the user layer nodes of the traversed branch, and if the path is the last path, determining whether there is a service type stored on the user group layer nodes on the traversed branch, and if there is a service type stored on the user group layer nodes, deleting the service type on the user group layer nodes on the traversed branch, and ending the operations on the traversed branch; if there is no service type stored on the user group layer nodes, ending the operations on the traversed branch; and if the path is not the last path, ending the operations on the traversed branch;

when the stored service type is a slave parameter updating service, performing the operations associated with the stored service type on the nodes comprises: invoking the buffer processing function to acquire the QOS slave parameters of the nodes with the service type stored thereon from the received service processing information, and substituting the acquired QOS slave parameters for the corresponding QOS slave parameters buffered by the nodes with the service type stored thereon; invoking the hardware management function to update the hardware resources of the nodes according to the QOS slave parameters after the substitution, and deleting the service type stored by the nodes with the service type stored thereon.

12. The method for enabling hierarchical quality of service services according to claim 5, wherein, when the received service type is a de-binding service, after traversing completely the object service tree, the method further comprises:
invoking the table management function to delete the table items including the application port and the application direction in the received service processing information in the software table.

13. The method for enabling hierarchical quality of service services according to claim 12, wherein, when the received service type is not a binding service, determining the object service tree and storing the received service type on the nodes to be processed of the object service tree is specifically:
inquiring the software table to determine the pointers corresponding to the application port and the application direction in the received service processing information, and determining the HQOS service tree pointed by the pointers as the object service tree; and determining the nodes to be processed according to relative offsets between layers where the nodes are located and the nodes in the received service processing information, and storing the received service type on each node determined to be processed.

14. The method for enabling hierarchical quality of service services according to claim 12, wherein, when the received service type is a binding service, the operation of determining the nodes to be processed and storing the received service type on the nodes to be processed of the object service tree comprises:
invoking a service tree generating function to generate the HQOS service tree, of which each node includes the service type, the pointers of the nodes, and pointers of farther nodes, and determining the generated HQOS service tree is the object service tree, treating all the nodes of the object service tree as the nodes to be processed, and storing the received service type on the nodes to be processed.

15. The method for enabling hierarchical quality of service services according to claim 12, wherein,
when the stored service type is a binding service or a sub-tree adding service, performing the operations associated with the stored service type on the nodes comprises: invoking a buffer processing function to apply buffer resources for the nodes with the service type stored thereon, and acquiring and buffering the QOS slave parameters of the nodes with the service type stored thereon from the received service processing information; invoking a hardware management function to configure hardware resources for the nodes with the service type stored thereon according to the buffered QOS slave parameters; invoking a table management function to add the pointers of the port layer nodes, the QOS master parameter of each node of the traversed branch as new table items to the configuration table, when determining there is no table item corresponding to the path where the traversed branch is located in the configuration table; and deleting the service type stored by the nodes with the service type stored thereon;
when the stored service type is a de-binding service or a sub-tree deleting service, performing the operations associated with the stored service type on the nodes comprises: invoking the hardware management function to release the hardware resources of the nodes with the service type stored thereon; invoking the buffer processing function to release the QOS slave parameters buffered by the nodes with the service type stored thereon and the buffer resources of the nodes with the service type stored thereon; invoking the table management function to delete the table items corresponding to the path where the traversed branch is located in the configuration table, when determining there are table items corresponding to the path where the traversed branch is located in the configuration table; and deleting the service type stored by the nodes with the service type stored thereon;
when the stored service type is a master parameter updating service, performing the operations associated with the stored service type on the nodes comprises:
A. determining whether the traversed branch is a first tree of the path where the traversed branch is located, and if the traversed branch is the first branch, invoking the table management function to delete the table items corresponding to the path where the traversed branch is located in the configuration table, substituting the QOS master parameters in the received service processing information for the QOS master parameters of the corresponding nodes on the traversed branch, and adding the pointers of the port layer nodes, the QOS master parameter of each node of the traversed branch after the substitution as new table items to the configuration table, deleting the user types on all nodes except the user group layer nodes on the traversed branch, and performing step B; if the traversed branch is not the first branch, performing step B;
B. determining whether the path where the traversed branch is located is the last path including the user layer nodes of the traversed branch, and if the path is the last path, determining whether there is a service type stored on the user group layer nodes on the traversed branch, and if there is a service type stored on the user group layer nodes, deleting the service type on the user group layer nodes on the traversed branch, and ending the operations on the traversed branch; if there is no service type stored on the user group layer nodes, ending the operations on the traversed branch; and if the path is not the last path, ending the operations on the traversed branch;
when the stored service type is a slave parameter updating service, performing the operations associated with the stored service type on the nodes comprises: invoking the buffer processing function to acquire the QOS slave parameters of the nodes with the service type stored thereon from the received service processing information, and substituting the acquired QOS slave parameters for the corresponding QOS slave parameters buffered by the nodes with the service type stored thereon; invoking the hardware management function to update the hardware resources of the nodes according to the QOS slave parameters after the substitution, and deleting the service type stored by the nodes with the service type stored thereon.

16. The method for enabling hierarchical quality of service services according to claim 7, wherein, when the received service type is not a binding service, determining the object service tree and storing the received service type on the nodes to be processed of the object service tree is specifically:
inquiring the software table to determine the pointers corresponding to the application port and the application direction in the received service processing information, and determining the HQOS service tree pointed by the pointers as the object service tree; and determining the nodes to be processed according to relative offsets between layers where the nodes are located and the nodes in the received service processing information, and storing the received service type on each node determined to be processed.

17. The method for enabling hierarchical quality of service services according to claim 7, wherein, when the received service type is a binding service, the operation of determining the nodes to be processed and storing the received service type on the nodes to be processed of the object service tree comprises:
    invoking a service tree generating function to generate the HQOS service tree, of which each node includes the service type, the pointers of the nodes, and pointers of farther nodes, and determining the generated HQOS service tree is the object service tree, treating all the nodes of the object service tree as the nodes to be processed, and storing the received service type on the nodes to be processed.

18. The method for enabling hierarchical quality of service services according to claim 7, wherein,
    when the stored service type is a binding service or a sub-tree adding service, performing the operations associated with the stored service type on the nodes comprises: invoking a buffer processing function to apply buffer resources for the nodes with the service type stored thereon, and acquiring and buffering the QOS slave parameters of the nodes with the service type stored thereon from the received service processing information; invoking a hardware management function to configure hardware resources for the nodes with the service type stored thereon according to the buffered QOS slave parameters; invoking a table management function to add the pointers of the port layer nodes, the QOS master parameter of each node of the traversed branch as new table items to the configuration table, when determining there is no table item corresponding to the path where the traversed branch is located in the configuration table; and deleting the service type stored by the nodes with the service type stored thereon;
    when the stored service type is a de-binding service or a sub-tree deleting service, performing the operations associated with the stored service type on the nodes comprises: invoking the hardware management function to release the hardware resources of the nodes with the service type stored thereon; invoking the buffer processing function to release the QOS slave parameters buffered by the nodes with the service type stored thereon and the buffer resources of the nodes with the service type stored thereon; invoking the table management function to delete the table items corresponding to the path where the traversed branch is located in the configuration table, when determining there are table items corresponding to the path where the traversed branch is located in the configuration table; and deleting the service type stored by the nodes with the service type stored thereon;
    when the stored service type is a master parameter updating service, performing the operations associated with the stored service type on the nodes comprises:
    A. determining whether the traversed branch is a first tree of the path where the traversed branch is located, and if the traversed branch is the first branch, invoking the table management function to delete the table items corresponding to the path where the traversed branch is located in the configuration table, substituting the QOS master parameters in the received service processing information for the QOS master parameters of the corresponding nodes on the traversed branch, and adding the pointers of the port layer nodes, the QOS master parameter of each node of the traversed branch after the substitution as new table items to the configuration table, deleting the user types on all nodes except the user group layer nodes on the traversed branch, and performing step B; if the traversed branch is not the first branch, performing step B;
    B. determining whether the path where the traversed branch is located is the last path including the user layer nodes of the traversed branch, and if the path is the last path, determining whether there is a service type stored on the user group layer nodes on the traversed branch, and if there is a service type stored on the user group layer nodes, deleting the service type on the user group layer nodes on the traversed branch, and ending the operations on the traversed branch; if there is no service type stored on the user group layer nodes, ending the operations on the traversed branch; and if the path is not the last path, ending the operations on the traversed branch;
    when the stored service type is a slave parameter updating service, performing the operations associated with the stored service type on the nodes comprises: invoking the buffer processing function to acquire the QOS slave parameters of the nodes with the service type stored thereon from the received service processing information, and substituting the acquired QOS slave parameters for the corresponding QOS slave parameters buffered by the nodes with the service type stored thereon; invoking the hardware management function to update the hardware resources of the nodes according to the QOS slave parameters after the substitution, and deleting the service type stored by the nodes with the service type stored thereon.

* * * * *